Sept. 15, 1925.                                                                    1,553,547
C. V. MILES
SUPPORT FOR CARRYING SPARE WHEELS OR RIMS ON MOTOR CARS
Filed Nov. 4, 1922                    2 Sheets-Sheet 2
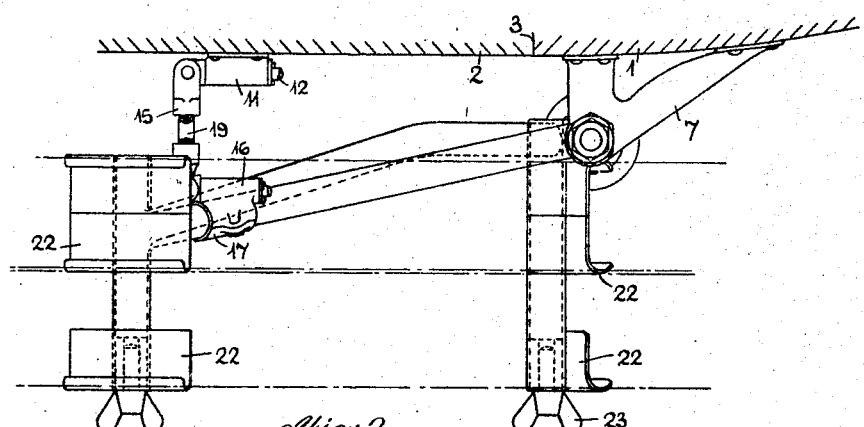
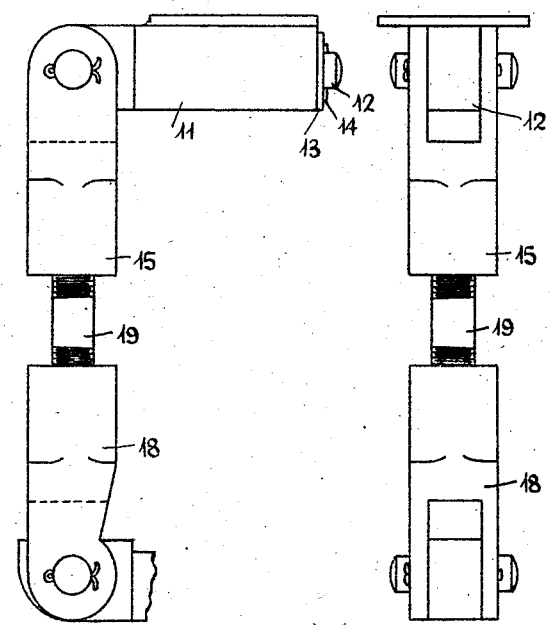
INVENTOR.
Charles Vaughan Miles.
by. A. P. O'Dell
Attorney.

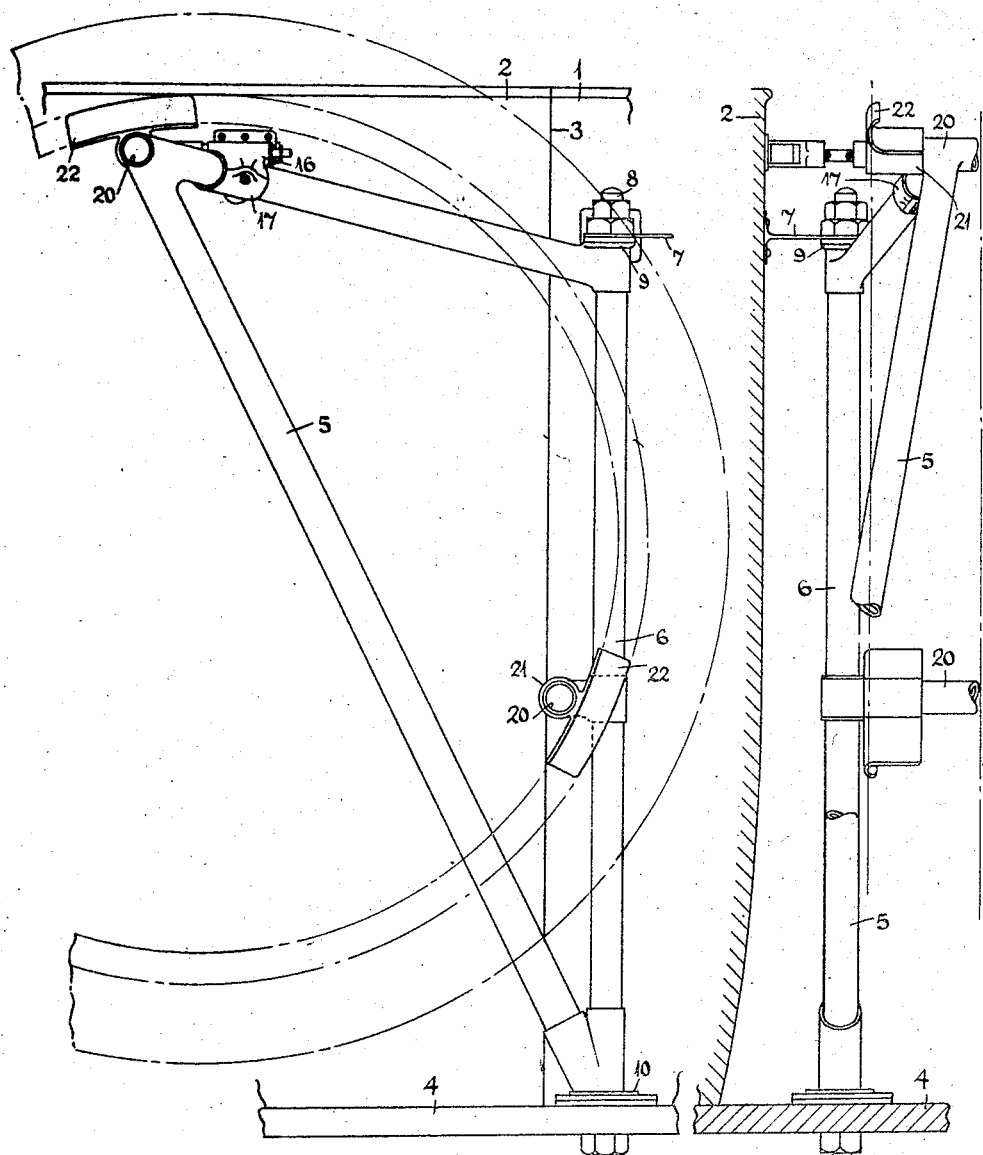

Patented Sept. 15, 1925.

1,553,547

UNITED STATES PATENT OFFICE.

CHARLES VAUGHAN MILES, OF FUNCHAL, MADEIRA.

SUPPORT FOR CARRYING SPARE WHEELS OR RIMS ON MOTOR CARS.

Application filed November 4, 1922. Serial No. 599,069.

*To all whom it may concern:*

Be it known that I, CHARLES VAUGHAN MILES, a subject of the King of Great Britain and Ireland, residing at Funchal, Madeira, have invented new and useful Improvements in Supports for Carrying Spare Wheels or Rims on Motor Cars (for which I have filed application in England No. 20189/1922), of which the following is a specification.

This invention relates to spare rim carriers and spare wheel carriers for motor cars, and in particular to carriers pivotally mounted on the car.

The purpose of the invention is to enable spare rims or wheels to be carried in the neighborhood of the car door or doors without interfering with the opening thereof. The invention consists in a carrier which can be mounted upon any car beside the door, and connected with the door so as to move with it and not to hinder its opening or damage it by colliding with it, nor to impose on the door hinges any part of the weight of the spare rims or wheels.

A specific embodiment of the invention hereinafter described in detail comprises a triangular tubular frame, having one member substantially vertical and carried pivotally in a bracket on the car body and upon the running board; said frame is provided with projections substantially at right angles to its plane, and each of these receives one or more clips adapted to support the desired spare rims or wheels, means being provided to retain in place upon each projection one clip or a plurality of clips as may be required. The free angle of the frame has a link pivoted upon it so as to swing both vertically and horizontally, and this link is similarly pivoted upon the door of the car. The link is preferably made adjustable in length.

In the accompanying drawings:

Fig. 1 is a side elevation of this embodiment of the invention.

Fig. 2 is an edge view thereof from the rear of the car.

Fig. 3 is a plan thereof.

Figs. 4 and 5 are plan and edge elevation respectively of the link connection between the frame and the door.

The invention is illustrated as applied to a car having a hinged side door in its body. The body proper is indicated at 1; 2 is the door hinged substantially upon the line 3. The car has a running board 4. The frame shown is a tubular triangular frame 5, having one member 6 substantially vertical and another approximately horizontal. The frame is mounted so that it may pivot on an axis substantially parallel with the hinge line 3; but it is important that its weight and the weight of the rims or wheels upon it shall not be borne by the hinges of the door. In the construction shown a bracket 7 is fastened upon the car body above the running board and near the hinge line of the door. A substantially vertical rod 8 is carried at its upper end in this bracket and its lower end is fastened in the running board 4. The tubular member 6 surrounds this rod and rotates upon it. Preferably ball bearings are interposed between the rod and the tubular member at 9 and 10.

On the door 2 is fastened a sleeve 11, seen on a larger scale in Figs. 4 and 5. There passes through this sleeve a pivot pin 12, retained in the sleeve by a washer and split pin 13, 14, or in other convenient fashion. The enlarged and flattened end of pin 12 is hinged to the forked end 15 of a composite link. A sleeve 16 is fastened by a clip 17, in part integral with it, to the approximately horizontal member of the frame 5. In this is pivotally carried, by a construction like that just described, the other forked end 18 of the composite link. The link is completed by a right and left-hand threaded pin 19 which offers a means of adjusting its length. In some cases it may be unnecessary to enable the link 15, 18, 19 to swing in a vertical as well as a horizontal plane.

Upon the substantially vertical member 6 of the frame, and also at its angle opposite this member are projections 20, substantially perpendicular to the plane of the frame. On these are carried clips adapted to support the particular kind of spare wheel or rim which is to be employed. In the construction shown the clips have a tubular part 21 adapted to slide on the projection 20, and an arc 22 with upturned edge adapted to fit the spare wheel or rim, and shaped to engage it firmly. The projections 20 may accommodate a plurality of clips. Fig. 3 shows in dotted lines how two rims may be carried by aid of these clips, while Fig. 2 shows the outer clips removed in readiness for a wheel or rim to be put in place. The clips are secured in position by a stud with a wing nut 23 which screws into the end of the projection. It will be obvious that this can fasten one, two or more rims or wheels in position as desired.

The weight of the spare rims or wheels is wholly borne by the running board 4 and bracket 7, and does not come at all upon the hinges of the door. When the door is opened the frame 5 turns upon its pivot with the door because of the link connection 15, 18, 19; the pivotal joints of the link permitting door and frame each to turn upon its own hinge line or pivot without interference.

I claim:

1. In a motor car the combination of a body, a running board, a hinged door in the side of the body, a frame pivotally mounted on the car with its pivoting axis substantially parallel with the hinge line of the door, clips upon said frame adapted to receive wheel rims, and a link hinged upon said frame at a distance from its axis and upon said door.

2. In a motor car the combination with a hinged door of a frame mounted on the car so as to pivot about an axis substantially parallel with the hinge line of the door, clips upon said frame adapted to receive wheel rims, and means connecting a point on the frame with a point on the door but permitting relative vertical and horizontal movement of said points.

3. In a motor car, a triangular tubular frame having one limb substantially vertical, means rotatably supporting said limb upon the car in proximity to the hinge line of a door thereof, clips upon said frame adapted to receive wheel rims, and a link connecting the free angle of said frame with said door and adapted to pivot both vertically and horizontally with respect to said frame and said door.

4. In a motor car the combination with the door of a frame pivotally supported on the car adjacent to the hinge line of the door, a link pivoting vertically and horizontally upon said frame at a distance from the pivotal axis of said frame, means connecting said link with said door but permitting the link to swing both vertically and horizontally, and means for varying the length of said link.

5. In a motor car the combination of a body, a hinged door in the side of the body, a frame pivotally mounted on the car with its pivoting axis substantially parallel with the hinge line of the door, clips upon said frame adapted to receive wheel rims, and a link of variable length pivoted on said frame at a distance from its axis, and upon said door.

In testimony whereof I have signed my name to this specification.

CHARLES VAUGHAN MILES.